United States Patent [19]

Jungwirth et al.

[11] Patent Number: 5,012,081

[45] Date of Patent: Apr. 30, 1991

[54] STRAPDOWN STELLAR SENSOR AND HOLOGRAPHIC LENS THEREFOR

[75] Inventors: Douglas R. Jungwirth, Reseda; A. Phillip Simpson, Rancho Palos Verdes; Mitsuo Kawahara, Perris; Seymour Levine, Topanga; John M. Kennel, Santa Ana, all of Calif.

[73] Assignee: Northrop Corporation, Hawthorne, Calif.

[21] Appl. No.: 369,790

[22] Filed: Jun. 22, 1989

[51] Int. Cl.⁵ ................................................ G01J 1/20
[52] U.S. Cl. .................................... 250/203.6; 250/216
[58] Field of Search ............... 250/203 R, 216, 203.6; 244/316; 350/537, 538, 557, 3.72, 3.73

[56] References Cited

U.S. PATENT DOCUMENTS

| 4,184,749 | 1/1980 | Grossman | 250/216 |
| 4,189,116 | 2/1980 | Ehrich et al. | 244/3.16 |
| 4,245,882 | 1/1981 | Chang | 350/3.72 |

Primary Examiner—David C. Nelms
Attorney, Agent, or Firm—Terry J. Anderson; Robert B. Block

[57] ABSTRACT

A star tracker for generating positional information for a vehicle includes a telescope 40 having multiple fields of view for imaging stellar objects. The telescope includes a plurality of radiation detectors 58 and an input lens 45 comprised of, in one embodiment of the invention, a plurality of holographic elements 45a and 45b. The holographic elements direct incident radiation originating from a plurality of stellar objects to an associated one of the radiation detectors. In another embodiment the multiple field of view telescope is comprised of a monocentric ball lens 80. The tracker may further include a multiplexer 60 for sequentially reading out a signal from each of the radiation detectors and a controller 62 coupled to the multiplexer for receiving the signals and for determining from the positions of the stellar objects imaged by the telescope a position of the vehicle.

22 Claims, 5 Drawing Sheets

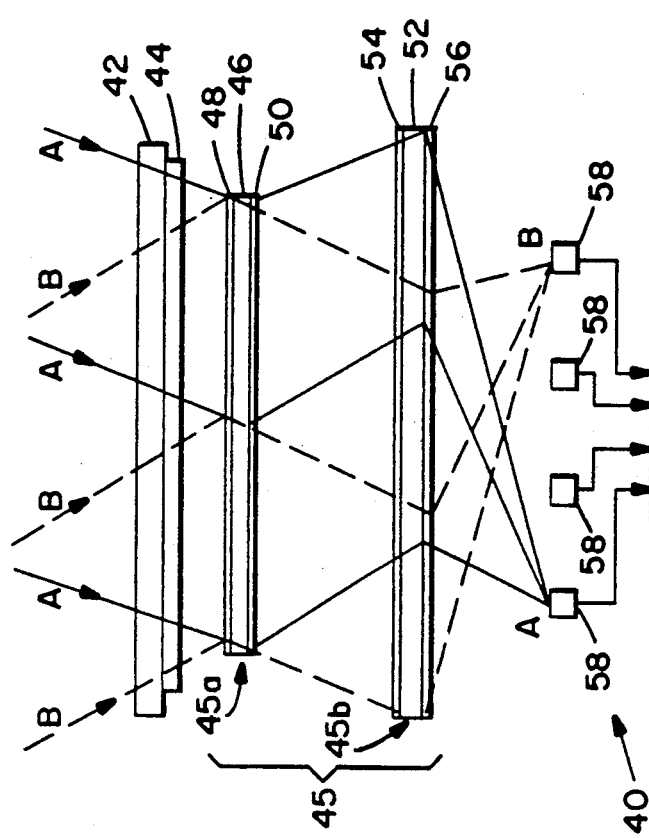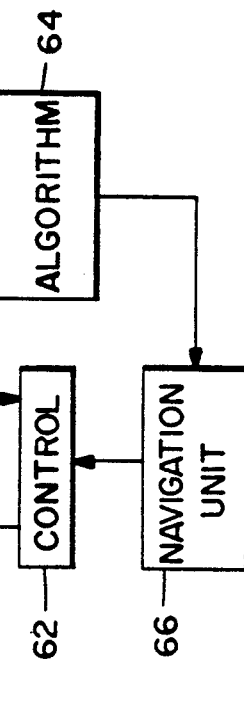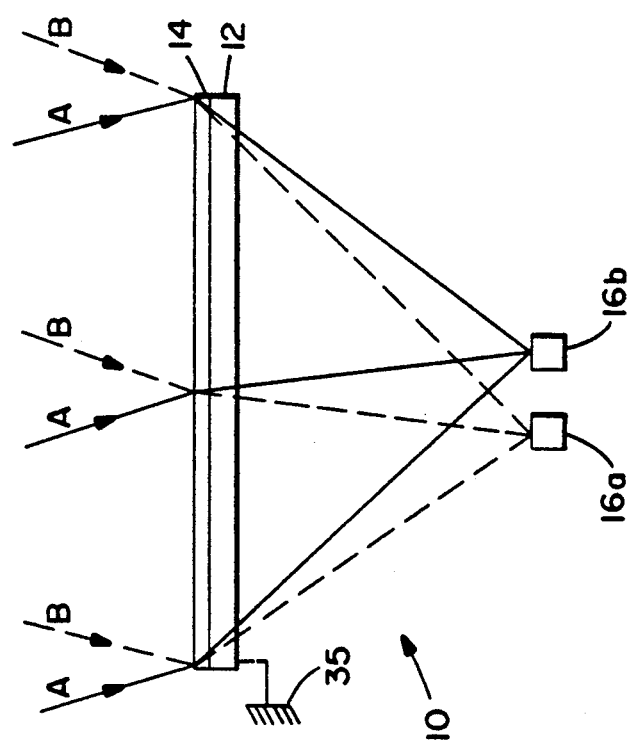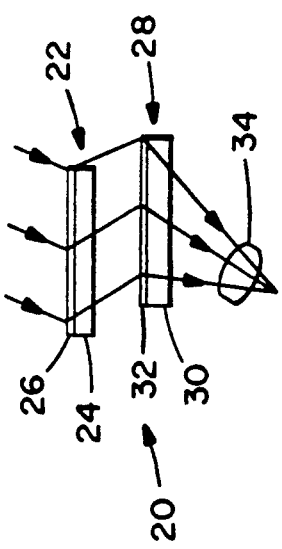

STRAPDOWN STELLAR SENSOR AND HOLOGRAPHIC LENS THEREFOR

FIELD OF THE INVENTION

This invention relates generally to stellar object sensors, including telescopes, and, in particular, relates to a multiple field of view strapdown star tracker having a wide angle input lens.

By a strapdown star tracker is meant an inertial navigator without gimbals that is directly attached, i.e., strapped-down, to a vehicle frame.

The invention also relates to a new class of holographic lenses which find as one application a use in the disclosed strapdown star trackers.

BACKGROUND OF THE INVENTION

The alignment of an inertial navigation system is essential for accurate performance. Normally, several different alignment modes are available to the system operator depending on the amount of time that is available before navigation must begin. For a system carried by an aircraft a typical set of gimballed inertial system alignment modes may include a single position ground alignment, a two position (gyrocompass) ground alignment, and an extended ground alignment involving multiple platform orientations with respect to local gravity and the earth rate vector. A two position alignment can provide adequate performance as it allows calibration of both level gyro biases.

However, for strapdown inertial navigation systems alignment accuracy is more difficult to achieve. The heading can be determined only to the accuracy of the effective east/west component of level gyro bias or, conversely, the effective east/west gyro bias can be ascertained only to the accuracy allowed by the input heading. In addition, inertial attitude errors have a much more severe impact on strapdown inertial navigation system performance than for gimballed systems as total vehicle body rates drive cross axis tilt errors and misalignment sensitivities. It is therefore of great benefit for strapdown inertial navigation systems to employ additional measurements to compensate for their inherent lack of calibration flexibility.

As can be seen in FIG. 6 star tracker is a particularly useful calibration aid for augmenting a strapdown inertial system 2 in that the star tracker 1 accurately observes system alignment errors, including strapdown inertial navigation system maneuver-induced errors. A star tracker and filter combination provides gyro drift and scale factor corrections, accelerometer bias corrections, tilt corrections, velocity corrections and position corrections to the strapdown Inertial Measurement Unit (IMU) 2. Furthermore, the star tracker 1 is self-contained, need not increase an aircraft's signature, and is not susceptible to hostile jamming.

Some conventional star trackers have a telescope that images one region of the sky at any given time. In order to view a plurality of stellar objects it is necessary to reposition the telescope. One technique repositions the telescope or the telescope's field of view (FOV) relative to the frame of the vehicle. However, this technique requires precision pointing apparatus, such as a gimballed platform, that adds to the cost and complexity of the star tracker and furthermore may in itself introduce a positional error. Such a positionable telescope is not considered to be a strapdown star tracker system.

The telescope may also be repositioned by movement of the vehicle itself. By example, the telescope may be fixed, or strapped down, to the frame of a satellite while the orbital and/or spin rate of the satellite is used to acquire different stars. While suitable for use in some types of satellite and missile applications this latter technique is generally not applicable to aircraft, especially high velocity aircraft, operated within the atmosphere.

Strapdown star trackers are also known that employ a plurality of smaller telescopes each pointing at a different area of the sky. A disadvantage of this type of system is that the effective entrance aperture, for a given size and weight of the star tracker, is divided among the plurality of telescopes. Thus, each of the plurality of telescope entrance apertures is smaller than that of a single telescope of equivalent aperture and, therefore, the light gathering capability and sensitivity of the system is compromised.

It is thus one object of the invention to provide a strapdown star tracker having a telescope that simultaneously views a plurality of regions of the sky.

It is another object of the invention to provide a strapdown star tracker having a telescope that employs a multiple field of view holographic lens as an input lens.

It is another object of the invention to provide a strapdown star tracker having a telescope that employs a wide field of view monocentric ball lens as an input lens. This wide field of view could be subdivided into a number of sub-fields of view with each sub-field of view focused on a single radiation detector

SUMMARY OF THE INVENTION

The foregoing problems are overcome and other advantages are realized by star tracker apparatus for generating angular information for a vehicle which, in accordance with the invention, includes a telescope having multiple fields of view for imaging stellar objects. In one embodiment of the invention the telescope includes either a single or a plurality of radiation detectors and an input lens that includes a plurality of embedded holographic optical elements in an aperture. The holographic elements direct incident radiation originating from a plurality of stellar objects to the detector or detectors. The star tracker may further include an electrical multiplexer for sequentially reading out a signal from each of the radiation detectors and a controller coupled to the multiplexer for receiving the signals and for determining from the positions of the stellar objects imaged by the telescope a position of the vehicle. Alternately the star tracker may include an optical multiplexer for multiplexing the output of each of the holographic optical elements onto a single radiation detector. The radiation detector is preferably a solid state, multi-element focal plane array type of device, such as a CCD or CID array.

In another embodiment of the strapdown star tracker of the invention the telescope includes a plurality of radiation detectors and an input lens including a wide field of view lens, preferably a monocentric ball lens, that defines an entrance aperture. The monocentric ball lens directs incident radiation originating from a plurality of stellar objects to the detectors disposed over a curved focal plane. Alternatively, fiber optic bundles having an input end disposed at the focal plane are employed to convey the focussed radiation to remotely disposed detector or detectors.

BRIEF DESCRIPTION OF THE DRAWING

The above set forth and other features of the invention will be made more apparent in the ensuing detailed description of the invention when read in conjunction with the attached drawing, wherein:

FIG. 1 shows in cross-section a volume hologram disposed on a transparent substrate for directing a plurality of input beams to a plurality of detectors;

FIG. 2 shows two volume holograms in a series arrangement which provides both aberration correction and optical power for an input optical beam;

FIG. 3 shows an embodiment of the invention wherein a star tracker has a telescope which includes a holographic optical input lens element;

DETAILED DESCRIPTION OF THE INVENTION

Figure 4A:
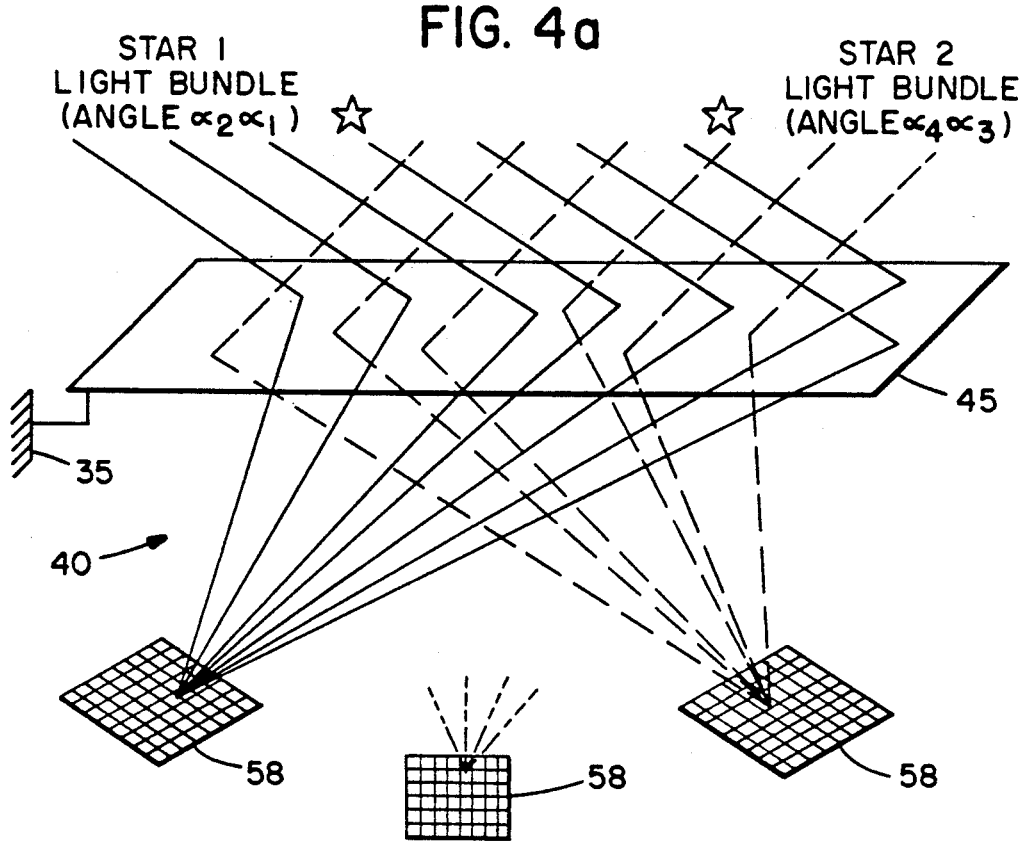
FIG. 4a shows a simplified view of the embodiment of FIG. 3 wherein light is directed to a plurality of multi-element detectors.

Referring to FIG. 1 there is shown in cross-section a holographic lens 10 comprised of a substrate 12 which is transparent at lens operating wavelengths and having a volume hologram 14 disposed on a surface thereof. The volume hologram 14 is fabricated by known methodology to contain, by example, two holograms within the same volume thereby allowing, in accordance with the invention, simultaneous viewing of two separated areas of the sky. Two incident beams (A,B) may have different focal lengths and may comprise different wavelengths of radiation if so desired. The volume hologram 14 can be comprised of, for example, a dichromated gel, silver halide, or a photopolymer; a method of fabricating such volume holograms being known in the art. The two input beams are shown being focussed upon two detectors 16a and 16b. In practice, detectors 16a and 16b each comprise multi-element solid state array detectors such as Charge Coupled Device (CCD) or Charge Injection Device (CID) type detectors. Although two such detectors are shown in FIG. 1, each receiving one of the beams, it can be realized that a single detector array can be provided with the input beams each being focussed upon a different region of the array. Alternatively, and as is shown in FIG. 4b, the two beams may be directed or multiplexed onto but a single radiation detector. For certain applications, since the stars are widely dispersed, it may be advantageous to directly focus different areas of the sky concurrently on one detector. The processor (110 of FIG. 8) has sufficient information to separate the star images. In practice, for a strapdown star tracker application the angular separation between the two beams is approximately 50° in order to provide the required positional accuracy for calibrating an inertial navigator and the viewing lenses and holograms disclosed for use in the present application are so constructed.

Several volume holograms, as shown in FIG. 1, can be stacked one on top of another with each maintaining an independent functionality so long as there is sufficient angular separation between each incoming beam of radiation. In that the thickness of the hologram determines the collection angle, a beam having an angle of incidence beyond the collection angle is unaffected. Thus, star radiation being directed to a particular detector is not adversely affected by passage through an adjacent volume hologram so long as the adjacent hologram has a different collection angle. Radiation outside of the collection angle passes through the hologram as though it were a simple piece of glass.

Referring to FIG. 2 it can be seen that several holograms can be disposed in a series arrangement to provide both aberration correction and optical power for an optical beam. The optical system 20 shown in FIG. 2 includes a first element 22 comprised of a substrate 24 and a volume hologram 26 and also includes a second element 28 comprised of a substrate 30 and a volume hologram 32. As can be seen, the element 22 has no optical power whereas the element 28 has power and focuses the input beam. The configuration shown in FIG. 2 can be employed to correct for lateral dispersion of the input beam. In addition, just prior to focus, conventional refractive element 34, by known methodology, can also be added to further minimize aberration. The addition of the multiple holograms and/or refractive elements provide for a focus over a wide band of wavelengths.

In accordance with the present invention the holographic lens or other viewing means, to be described, is affixed to the vehicle body 35 as by being mounted in a fixed position at a viewing window placed on the top of the vehicle.

Such a two-element optical system can further be employed to implement an input lens of a telescope, as is described below.

Referring now to FIG. 3 there is shown a multiple field of view telescope 40 constructed in accordance with the invention and forming a portion of one embodiment of a strapdown star tracker 41. Telescope 40 is mounted behind a window 42 which is typically attached to a vehicle that conveys the telescope 40. Optically coupled to the window 42 is a filter 44 that serves to filter out wavelengths other than the wavelengths of interest in order to minimize background light, lens aberrations and heating of the detector. The filter may be attached to, or be an integral part of, any of the optical elements. An input lens 45 of the telescope 40 includes a first holographic lens 45a and a second holographic lens 45b. Lens 45a includes a transparent substrate 46, the substrate 46 having on a first, top surface a first volume hologram 48 and on a second, bottom surface a second volume hologram 50. Volume holograms 48 and 50 may each comprise two or more holographic elements disposed within a film comprised of, by example, a dichromated gel, silver halide, photopolymer or other photo-settable emulsion.

Mounted in serial arrangement with the lens 45a is the lens 45b which includes a transparent substrate 52 having a third volume hologram 54 on a top surface thereof and a fourth volume hologram 56 on a bottom surface thereof. It can be seen that the substrate 52 and its attendant volume holograms 54 and 56 are wider in diameter than the substrate 46 and its attendant holograms 48 and 50. This difference in width makes it possible for the third and fourth volume holograms to intercept the ray bundles which pass through the first and second volume holograms.

It should be noted that the two holographic lenses 45a and 45b of the telescope 40 of FIG. 3 are similar to those shown in FIG. 2 wherein the the lenses act to focus the beam and provide aberration corrections. In cases where there is an object that is illuminated by a monochromatic light source (such a a laser beam) then a single holographic lens element as illustrated in FIG. 1 can focus the beam.

The second holographic lens 45b focuses each of the ray bundles upon an associated detector 58, each associated detector 58 typically including a CCD array. Although four CCD detectors 58 are shown in FIG. 3 it should be realized that more or less than this number can be employed. Furthermore, to simplify the drawing only two beams A and B are shown in FIG. 3 although more than this number are readily viewed by the telescope 40 of the invention. Each of the detectors 58 is coupled to an electrical multiplexer 60 which sequentially reads out CCD detector signals on command from a control device, such as a computer 62. Computer 62, in accordance with an appropriate data reduction algorithm 64, operates to control the multiplexer 60 to read the array data, determine star locations, calculate star related centroid data and thereafter transmit position data to a navigation unit 66. The navigation unit 66 includes gyroscopes, such as ring laser gyroscopes (RLGs) or fiber optic gyroscopes (FOGs), accelerometers and associated control mechanisms. Star position updates are provided from the data reduction algorithm 64 to update the navigation unit 66 position or tilt. Thus, the computer 62 receives updated projected position information for use in guiding the vehicle.

It can be seen that the telescope 40 functions as a plurality of telescopes having a common large aperture in that it is provided with multiple fields of view by the input holographic optical lens element. Different sources viewed by the telescope 40 can be separated by angles in excess of 90°, the individual fields of view being determined by the effective focal lengths and the size of the detector array. The image quality is near diffraction limited with the entire clear aperture being used for all sources such that excellent collection efficiencies are achieved. The individual CCD array detectors 58 are typically rapidly scanned by the multiplexer 60 such that the individual fields of view are also scanned in a relatively rapid manner. Of course, if desired, each of the detectors 58 could be provided with a separate control means 62 for achieving substantially parallel operation with others of the detectors 58.

Figure 4B:
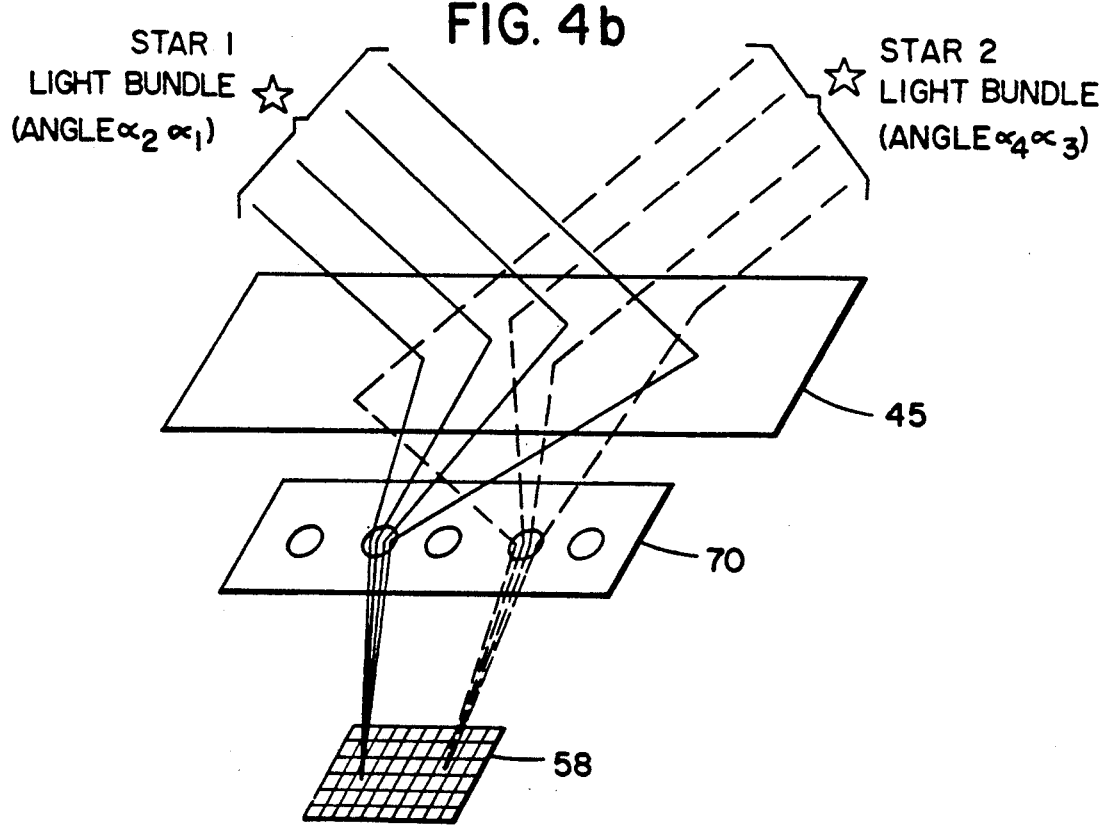
FIG. 4b shows a simplified view of a variation of the embodiment of FIG. 3 where light is directed to a single multi-element detector.

FIG. 4a shows a simplified view of telescope 40 of FIG. 3 wherein it can be seen that the lens 45 focuses light bundles from a plurality of stars onto a plurality of multi-element detectors 58. Each detector 58 may be an array comprised of, by example, 1024×1024 or more discrete detector elements.

FIG. 4b shows an alternate embodiment of the telescope 40 wherein an optical multiplexer such as a shutter selection matrix 70 is disposed at focal points of the holographic lens 45. The matrix 70 is electronically actuable, such as by computer 62, to selectively pass the focussed light bundles to a single multi-element detector array 58. This embodiment eliminates the requirement for multiple CCDs.

One important telescopic advantage made possible by the holographic telescope star tracker embodiment disclosed above is due to the inherent spectral selectivity of a holographic lens. That is, only radiation within a narrow range of wavelengths is focussed. This feature of holographic lenses beneficially reduces the effects of background glare and other broad spectrum interference sources. This feature may also be exploited when viewing objects that are illuminated by a narrow spectrum source, such as a laser designator, in that the illuminated object will be readily visible against a background if the holographic lens is designed to selectively pass wavelengths emitted by the narrow spectrum source.

The wide angle, full aperture star tracker holographic telescope 40 described above has a finite, although possibly very large, number of input beam axes that pass through a common full aperture. In accordance with another embodiment of the invention there is now described another wide angle, full aperture star tracker having a wide angle lens, preferably a Baker monocentric ball lens, that has an infinite number of input beam axes.

Figure 5A:
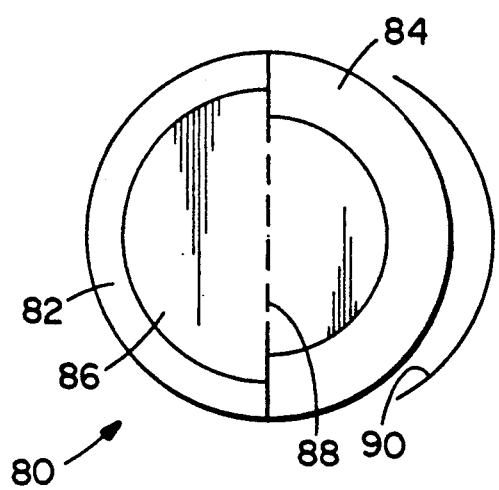
FIG. 5a shows a simplified cross-sectional view of a monocentric ball lens.
Figure 5B:
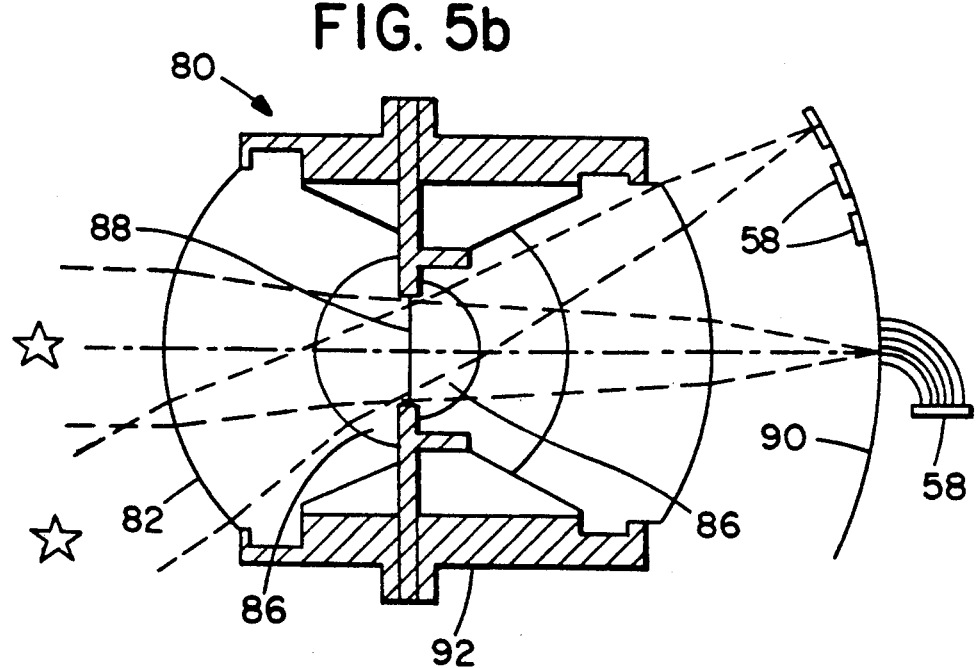
FIG. 5b shows in greater detail a cross-sectional view of a monocentric ball lens disposed adjacent to a focal plane for focussing incident radiation thereon.

For a strapdown star tracker application, the monocentric ball lens 80 illustrated in FIGS. 5a and 5b has unique advantages over other types of lenses. The monocentric ball lens 80 includes an entrance curved lens 82 and and exit curved lens 84. Lenses 82 and 84 are comprised of high index of refraction glass. An interior lens 86 is comprised of low index of refraction glass. Since all surfaces have the same center of curvature and there is no unique optical axis, every principal ray passing through the lens 80 defines its own optical axis. Thus, there are in theory no off-axis aberrations or distortions. In practice, an aperture stop 88 is placed at the center of curvature and some off-axis aberrations are introduced whenever the principal ray makes a finite angle with the normal to the field stop. In addition, because the surfaces are all concentric and the aperture stop 88 is at the common center, the rate of illumination falloff is proportional to the cosine between the field angle and the normal to the field stop. For most other lenses, the rate of illumination falloff is proportional to the fourth power of the cosine. Thus, the monocentric ball lens 80 has a much larger field of view for any given light dropoff. The above properties of the monocentric ball lens give it an exceptionally wide FOV (more than 60°) with a minimal aberration and image distortion. These properties make the monocentric ball lens 80 especially suitable for use in the wide angle star tracker optical system of the invention.

As can be seen in greater detail in FIG. 5b the lens 80 is constructed of a plurality of glass elements having high and low indices of refraction as indicated. A curved focal plane 90 is provided whereon the incident star light bundles are focussed. Focal plane 90 typically is covered or tiled with a plurality of focal plane array detectors 58. Alternatively, fiber optic bundles 59 can be provided for conveying focussed radiation from the focal plane 90 to remotely disposed detector(s) 58. A frame 92 supports the lens elements.

Having thus discussed two presently preferred embodiments of a wide angle telescope for the strapdown star tracker of the invention, other elements of the system will now be discussed in greater detail.

In further regard to the various detector arrays discussed above a CCD detector array, such as the array 58, can be regarded as performing two distinct tasks. The first task is the photosensing process whereby incident image energy is converted to charge packets and collected in the individual MOS capacitor gates. Each of the gates holds a charge representing a small portion of the entire image. The portion of total image that the charge represents defining a picture element or pixel. Thus the input image is sensed and stored as discrete pixels. The second task performed by the CCD is the transferring of charge out of the device. This includes a conversion of the charge to voltage via an associated output amplifier.

It can be shown that for a detector pixel linear dimension that subtends approximately 10 arc seconds a pixel linear dimension of approximately 50 microns is required. Thus, for a 1024×1024 element detector array 3° is subtended along one axis of the array or approximately 9 square degrees for the entire array. It can be shown that for a detector array that covers a 3° FOV in order to utilize the full 60° FOV of the lens would require 307 detectors.

Furthermore, a star tracker as described herein requires that the spectral responsivity of the sensor match the spectral emission band of available star energy. The detector 58 and more specifically the detector material must be capable of detecting star energy at the wavelengths at which it is emitted. Atmospheric transmittance and optical attenuation must also be considered when selecting a detector material.

It is known that a significant portion of the star energy is contained in the 0.1 to 5.0 micron band. However, it is also known that star tracker system optics, including the vehicle window 12, lenses made of conventional optical materials and the associated detector 58 faceplate, serve to attenuate star energy at wavelengths below approximately 0.3 micron. The atmosphere also attenuates star energy through scattering and absorption. The cumulative effect of these various energy losses causes the available star energy to lie in approximate bands from 0.3 to 1.3, 1.5 to 1.8, 2.0 to 2.5 and 3.0 to 4.2 microns. With star energy near 0.7 micron the band from 0.3 to 1.3 microns spectrum, is one desirable range of wavelengths for star tracker detector 58 operation. Silicon is one presently known detector material that operates within this region. However, it should be noted that there are a number of stars that are known to emit significant radiation with the Infrared (IR) band out to approximately 10 microns. One advantage to operating within the IR band for stellar sources is that the effect of background glare is reduced. Of course, known types of detector materials such as Group II-VI and other efficient absorbers of IR radiation need be employed when sensing IR radiation. The telescope can easily be optimized to operate in the IR region.

A second factor in the ability of the detector 58 to image stellar energy is the detector's quantum efficiency (QE). The QE is a measure of the detector's ability to convert incident radiation into signal charge. The QE varies with wavelength and yields a smaller, optimal band of energies over which the detector will function. Fortunately, silicon detectors have QEs peaking in the 0.7 micron range that coincides with a portion of available star energy. The QE parameter, in a strapdown star tracker, is an important consideration. A star tracker operating in a bright daytime sky environment is background noise limited. Modeled simply, the signal-to-noise ratio can be expressed as the ratio of signal photon flux over the square root of the background photon flux. Both the signal and background photons are multiplied by the QE of the detector so that the QE determines, in part, the integration time necessary to collect the required charge.

Sky background brightness data, together with photon flux data for stars of various magnitudes can be employed to calculate a signal-to-noise ratio for the detector 58 as a function of integration time. A simple expression for the signal-to-noise ratio in the background limited case is given by:

$$S/N = \frac{\phi_s t \sqrt{\eta}}{\sqrt{\phi_b t}}$$

where
$\phi_s$ = signal photon flux (photons·sec$^{-1}$)
$\phi_b$ = background photon flux (photons·sec$^{-1}$)
$\eta$ = quantum efficiency
$t$ = integration time In regard to the data processing functions discussed above it is shown below that for a star tracker using a focal plane array detector 58 that certain of the data processing functions are invariant across all systems designs and configurations, regardless of detector 58 motion during star tracking. Other functions, related to the added complexity of compensating for detector motion, are also discussed in detail hereinafter.

Discussing now the invariant data processing functions it can be shown that the star tracker performs four tasks. The star tracker computes an estimated star location, acquires a star, determines the sensed location and computes an angular error from the expected position.

The expected star location is calculated based on a star list, the time, current position and aircraft attitude. Given these, the approximate location of a star image on the detector 58 array is known. Once the integration time is set, the detector 58 is read in an area surrounding the expected image location. Several frames of data may need to be collected before a sufficient signal-to-noise ratio is achieved. For short integration times, frame averaging is also necessary to remove the effects of star image scintillation.

Next, the star image must be extracted from the frame of data. The star image is typically distributed across a plurality of detector 58 pixels. A sky background bias, sky background gradient, sky background photon noise and other noises are additively present also. Successful removal of the background biases allow a thresholding of the frame with the threshold set at the additive noise ceiling. After thresholding, pixels containing signals are compared to all of their nearest neighbors and clusters of pixels containing signals are separated. The signal in each of the pixels is summed and the sums for the various clusters compared to the expected sum for the star as stored in the star catalog. A favorable comparison indicates star detection. The process is repeated if the desired star is not detected. Initial acquisition of a star after restarting the star tracker, due to malfunction or simply poor estimate of star position, may require that the above process be repeated several times in a search pattern.

Position determination of the star on the detector 58 array requires computing the centroid of the distribution of star energy. The centroid is used as the star position and its position on the array is calculated relative to a coordinate system defined by the array. The angular distance between this position and the expected star position is then provided to the control device 62 for updating position and tilt estimates of the navigation unit, 66.

Image motion levels vary from vehicle to vehicle. If known types of shock isolators are provided the range of motion environments that must be tolerated can be reduced. At frequencies below the natural frequency of the shock mounts, the vehicle motion is not attenuated. Under these conditions the star image will move across the detector 58 pixels at the vehicle's angular rate. Above the natural frequency, the stellar inertial system's shock isolators attenuate vehicle vibration sharply, thereby eliminating a requirement for extremely high rate image motion compensation.

Figure 6:
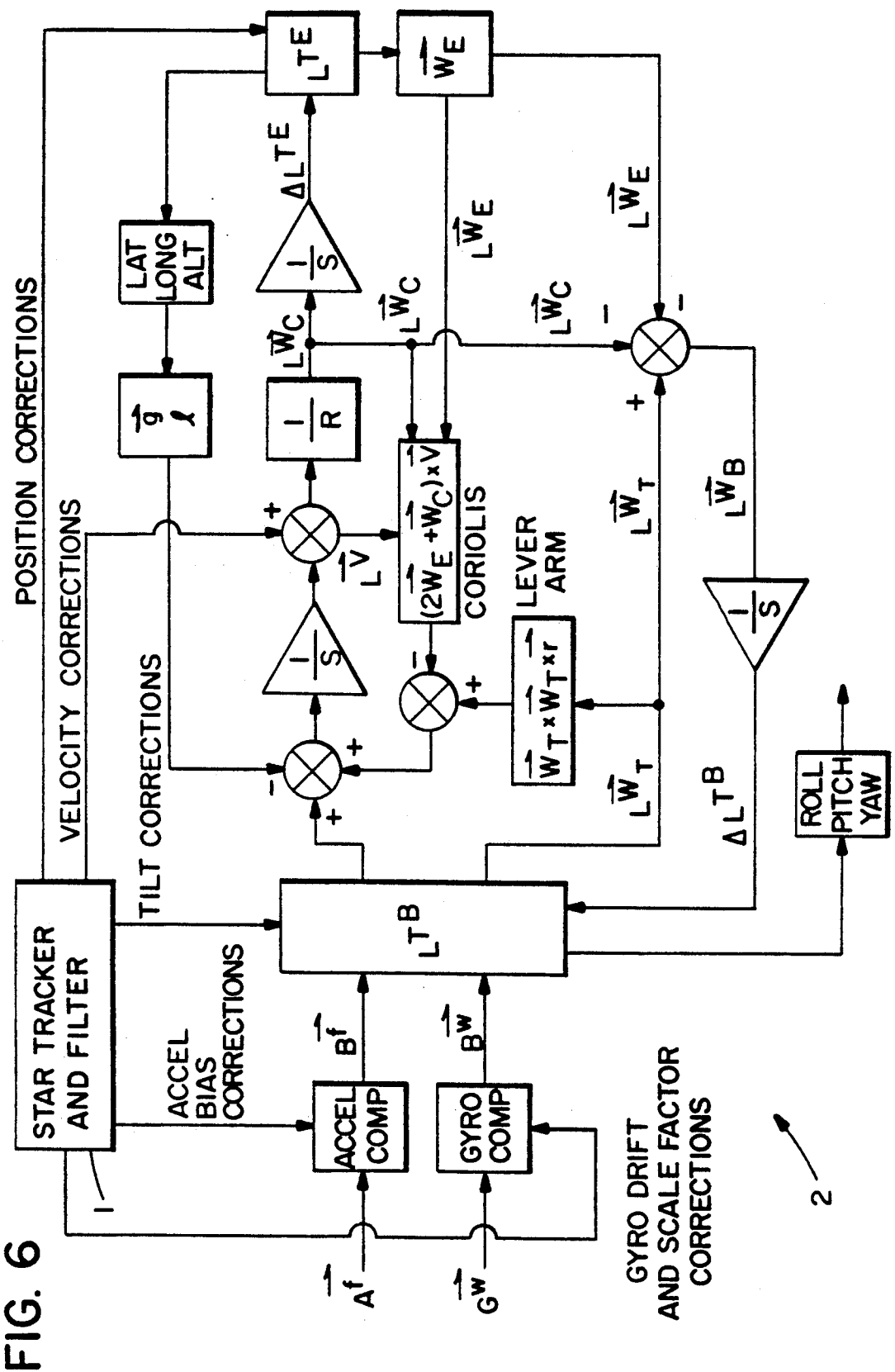
FIG. 6 is a block diagram showing a star tracker and filter coupled to an IMU.

The strapdown inertial sensor assembly 2 and the star tracker 1 of FIG. 6 may both be mounted to a common rigid bedplate, not shown, that provides a known relative attitude between the star tracker optical system and the inertial instrument cluster. This integrated system may also be isolated from small amplitude, low to moderate frequency vehicle oscillations by an active suspension system. The instrument cluster gyros sense the angular displacement of the stellar/inertial sensor assembly and provide a feedback signal to the active mount. The mount itself can be mechanized in many ways. An example would be a set of piezo-electric bi-morphs or magneto-strictive elements that expand or contract as a function of an applied voltage or magnetic field. These solid-state dynamic mount drivers need be active for only a short time during image processing. Such an active mount mechanization provides for a relatively simple processing of the star image because the image is held fixed on the detector focal plane for the duration of the imaging array exposure time. However, the drivers and servos for the solid-state active mounts add complexity and weight to the system.

A variation of this solid-state motion isolation embodiment shifts the accumulating photoelectric charge in response to sensed angular rotation increments from the gyro cluster. The gyro signal is employed to provide a charge shift command to the imaging array to cause the accumulating charge to remain under the star image as the star image moves. In this manner the star signal is integrated over an interval of time sufficient to form a detectable image. This embodiment has the advantage of requiring no physical motion for motion compensation, but requires a custom imaging array that is capable of dynamic charge shifting in two dimensions. Two relatively complex array shift controllers would also be required. Like the solid-state isolation scheme, the star image processing task is relatively simple. At some point during the integration interval the absolute inertial attitude of the stellar/inertial sensor assembly is recorded and referenced to the image array. In this manner the final star image location is correlated to an expected location, and an error computed to correct the inertial system.

A presently preferred embodiment samples the imaging arrays in a rapid manner, thereby effectively "freezing" the vehicle motion. Inertial attitude data interpolated to the instant of exposure provides data on the pointing attitude of the detector array. Multiple exposures are aligned by the computer and integrated to form a single image that is free of motion-induced blur.

This preferred embodiment requires that updates motion compensation data be provided at a rate several times the highest frequency of oscillation that is expected to be passed by the system shock isolators. In addition, a common time reference for array sample data and inertial motion compensation data is provided. The data processing for this preferred motion compensation embodiment is more complicated than for the other embodiments but has the advantage of increasing the dynamic range of the star detection process beyond the actual photodetector capabilities. This allows for long integration times which permits the tracking of dimmer stars in brighter sky backgrounds.

The previously provided discussion of data processing for no image motion sets forth basic steps involved in processing star image data to extract useful navigation information. The added strapdown star tracker requirements of imaging very dim stars in the presence of vehicle motion increases the computational load on both hardware and software.

It has been shown that the detector array 58 necessary for obtaining adequate image resolution is relatively large and requires a substantial amount of time to read out for each frame integrated. However, a significant amount of data processing is eliminated, saving considerable time, if the number of pixels read for a particular frame is reduced. For example, known types of detector arrays have separate horizontal and vertical clocking rates that are independently varied thereby enabling a small rectangular portion of the array to be read out with the remaining charge being discarded.

Figure 7B:
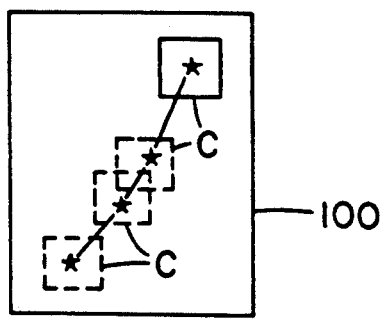
FIGS. 7a and 7b illustrate the sizing of and the tracking with a rectangular subset of CCD array pixels.
Figure 7A:
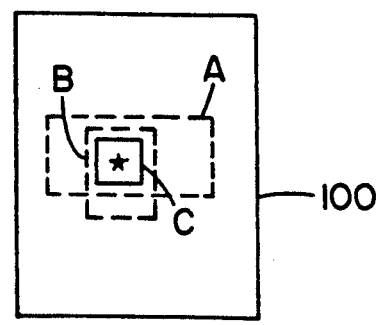

A method of tracking a star using such a programmable small rectangle readout technique is shown in FIGS. 7a and 7b and is now described. Acquisition begins with selection of rectangle size. Both the size and position of the rectangle are varied using a programmable clocking pattern generator as shown in FIG. 7a. The rectangle size is set according to the estimated uncertainty in star image location on the detector array 100. Prior to initial star acquisition the rectangle size is quite large (A). After star acquisition, the image location becomes known and the readout rectangle size is reduced (B,C). Star tracking, shown in FIG. 7b, requires that the read rectangle (C) follow the star image as it moves on the array 100. The star location on the array is known from vehicle attitude and attitude rate information. Size determination also accounts for integration time variations and required processing time for various sized rectangles.

One aspect of the strapdown star tracker of the invention is the summation of multiple image frames in order to achieve the necessary signal-to-noise ratio for detection. Summation in the presence of vehicle motion is accomplished by monitoring vehicle attitude, and hence detector motion, relative to the sky reference frame. Detector output is stored for repeated, yet translated, image frames in a single location whose coordinates lie in a frame fixed relative to that of the sky. That is, the motion is compensated for, and the separate image frames are summed and stored together even through they are physically imaged at different places on the detector. The read rectangle (C) is fixed to the sky reference frame by means of varying its position on the detector 100. To search for a star at initial acquisition time, the whole search pattern is made to move with the star and remain fixed to the sky reference frame.

Tracking a star with the above technique allows short integration times to be utilized. Short integration times advantageously prevent the detector 100 from saturating in the bright daylight sky and also allow sampling of the star image at a frequency much less than vehicle rates such that image motion is small during integration. Such short integration times, however, coupled with image smear due to image motion, allow only a small amount of star signal to gather on any pixel since photons are emitted at a fixed average rate.

Such small signal levels present a problem for conventional methods of reading charge from a CCD detector. Typically, the charge is clocked off of the detector as a voltage, amplified and converted to discrete digital values using an A/D converter. For signal levels less than an A/D converter quantum, however, the signal cannot be digitized.

One solution to this problem is achieved by employing an A/D converter having a higher resolution. By example, a 16-bit A/D converter when coupled with a CCD having a 70,000-electron pixel capacity. By this technique all signal processing is accomplished digitally and additional analog noise sources are not a concern.

Alternatively, signal summation may be accomplished partly in the charge domain until enough signal is accumulated to digitize to the desired resolution. A CCD analog memory is employed to store repeated frames. Sky background saturation limits are avoided by encoding only the first difference of the serial data thereby subtracting unwanted biases but passing high spatial frequencies such as star images. Again, flexible clocking allows an image to be stored anywhere in the CCD memory just as it allows an image to be taken anywhere on the CCD.

Figure 8:
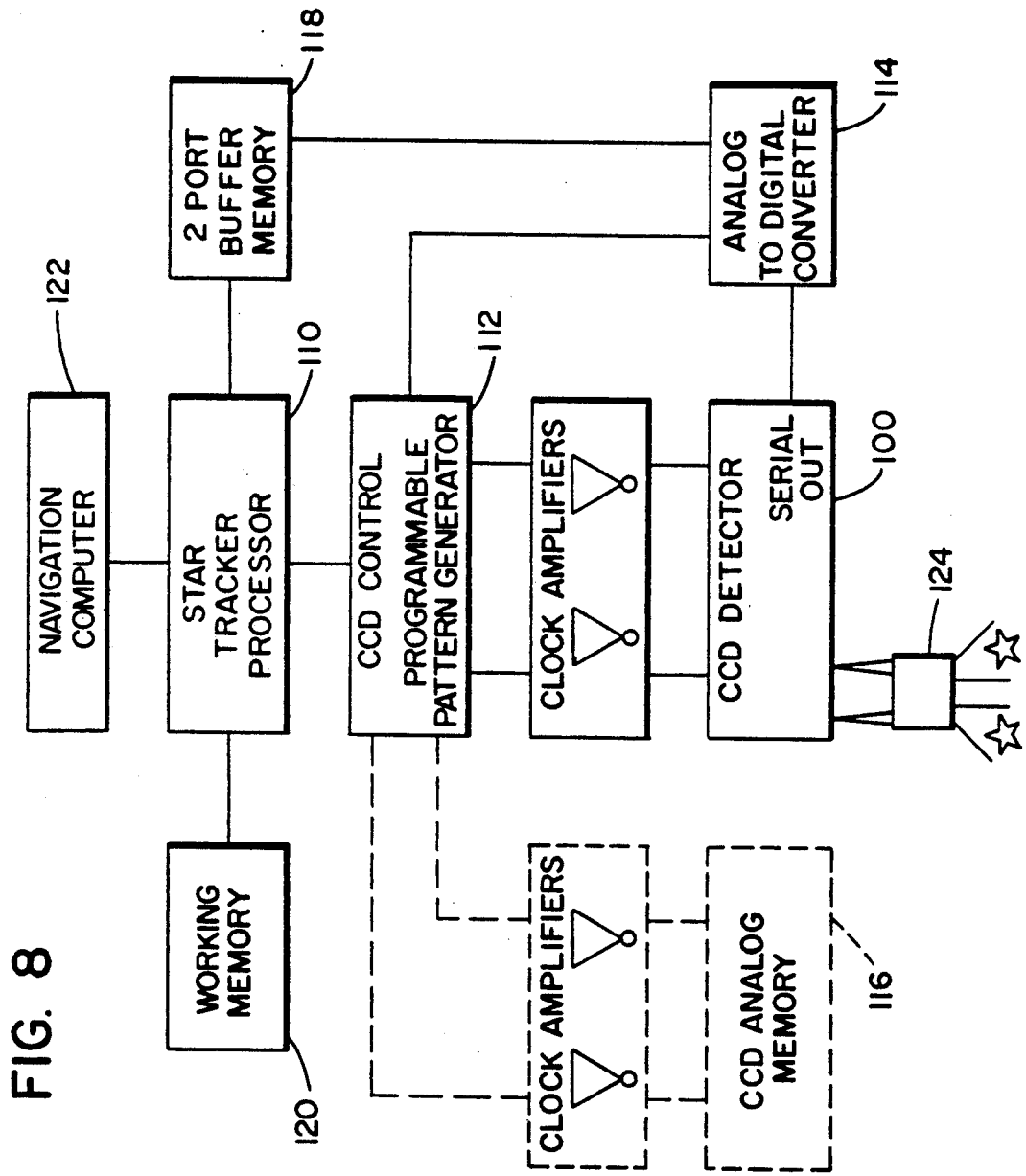
FIG. 8 is a block diagram showing a presently preferred embodiment of a strapdown star tracker including a star tracker processor and associated devices.

In accordance with a presently preferred embodiment of the wide FOV strapdown star tracker, shown in FIG. 8, a star tracker processor 110 controls the read rectangle size and position by issuing commands to CCD control logic 112. The control logic 112 includes a programmable pattern generator used to produce the clocking sequence for the CCD detector. Logic is also included for control of an A/D converter 114 and CCD analog memory 116, if included. A two-port buffer memory 118 stores star image data until it is read by the star tracker processor 110. The buffer memory 118 has a sufficient number of storage locations to hold the data contained in the largest size variable read rectangle. All search, tracking, detection, and other data processing software resides in the tracker processor working memory 120. The working memory 120 also accommodates multiple image storage for digital frame integration. The navigation computer 122 supplies vehicle rate, time and star catalog data to the star tracker software executing in the star tracker processor 110. An angular error in star position is passed to the navigation computer 122 as an aid in calibrating the associated IMU. Of course, the CCD detector receives star radiation input through either of the wide angle telescope embodiments disclosed above. Specifically, a telescope 124 is constructed in accordance with the holographic lens embodiment of FIGS. 3, 4a or 4b or with the monocentric ball lens embodiment of FIGS. 5a and 5b.

While the invention has been particularly shown and described with respect to a preferred embodiment thereof, it will be understood by those skilled in the art that changes in form and details may be made therein without departing from the scope and spirit of the invention.

What is claimed is:

1. A strapdown star tracker for generating navigational navigational information from an assumed position given by an inertial measurement unit aboard a vehicle, and said star tracker being adapted to be strapped down to the vehicle as it moves, comprising
    viewing means having an entrance aperture and a field of view for simultaneously focussing radiation from a plurality of stellar objects, or other heavenly bodies, separated one from another by an angular displacement,
    means for strapping down said viewing means in a fixed orientation in said vehicle,
    means for converting the focussed radiation to plurality of detectable electrical signals one for each stellar object or heavenly body, and
    means coupled to said converting means and responsive to each said electrical signal for deriving inertial measurement unit correctional information from said electrical signal and for applying the correctional information to the assumed position.

2. A strapdown star tracker as set forth in claim 1 wherein said focussing means comprises at least one holographic lens element.

3. A strapdown star tracker as set forth in claim 1 wherein said focussing means comprises a first holographic lens and a second holographic lens in serial arrangement one with the other.

4. A strapdown star tracker as set forth in claim 3 wherein each of the first and the second holographic lens comprises a transparent substrate having a first volume hologram disposed on a first surface thereof and a second volume hologram disposed on a second, opposite surface.

5. A strapdown star tracker as set forth in claim 4 wherein each of the volume holograms includes a plurality of holographic optical elements each having a different collection angle.

6. A strapdown star tracker as set forth in claim 5 wherein the first holographic lens has substantially zero optical power and corrects for aberration and wherein the second holographic lens has optical power for focussing the radiation upon said converting means.

7. A strapdown star tracker as set forth in claim 1 wherein said focussing means comprises a monocentric ball lens.

8. A strapdown star tracker as set forth in claim 7 wherein said monocentric ball lens has a curved focal plane having said converting means disposed thereon.

9. A strapdown star tracker as set forth in claim 7 wherein said monocentric ball lens has a curved focal plane having at least one fiber optic bundle optically coupled thereto for conveying focussed radiation to said converting means.

10. A strapdown star tracker as set forth in claim 1 wherein said radiation is within a range of wavelengths from approximately 0.1 to approximately 10 microns.

11. A strapdown star tracker as set forth in claim 10 wherein said converting means includes a CCD or a CID detector array having a plurality of pixels comprised of silicon or of gallium arsenide.

12. A strapdown star tracker as set forth in claim 10 wherein said converting means comprises a focal plane array comprised of a material responsive to IR radiation.

13. A strapdown star tracker as set forth in claim 10 wherein said converting means includes a CCD or a CID detector array having a plurality of pixels, and wherein said deriving means comprises digital data processing means coupled to said array by means for selectively raading out selected ones of said pixels.

14. A strapdown star tracker as set forth in claim 13 wherein said means for selectively reading out reads out rectangular regions of pixels for acquiring and tracking a star across a radiation receiving surface of said array.

15. A strapdown star tracker as set forth in claim 14 and further comprising means for buffering successively read out regions of pixels before the successively read out regions of pixels are inputted to said digital data processing means.

16. Star tracker apparatus for generating positional information for a vehicle, comprising:
a telescope having multiple fields of view for imaging stellar objects, the telescope comprising a plurality of radiation detection means and an input lens comprising a plurality of holographic elements for directing incident radiation originating from a plurality of stellar objects to either one or an associated one of the radiation detection means;
multiplexer means for sequentially reading out a signal from each of the radiation detector means, the signal having a magnitude which is a function of the radiation incident upon the radiation detector means; and
control means coupled to the multiplexer means for receiving the signals and for determining from the positions of the stellar objects imaged by the telescope a position of the vehicle.

17. Star tracker apparatus as set forth in claim 16 wherein the control means is coupled to a navigation means which maintains a position of the vehicle, the control means comparing the position maintained by the navigation means to the position determined by the control means for generating a corrected position for the navigation means.

18. Star tracker apparatus as set forth in claim 16 wherein the input lens comprises a first holographic lens and a second holographic lens in serial arrangement one with the other.

19. Star tracker apparatus as set forth in claim 18 wherein each of the first and the second holographic lens comprises a transparent substrate having a first volume hologram disposed on a first surface thereof and a second volume hologram disposed on a second, opposite surface.

20. Star tracker apparatus as set forth in claim 19 wherein each of the volume holograms includes a plurality of holographic elements.

21. Star tracker apparatus as set forth in claim 20 wherein the first holographic lens has substantially zero optical power and corrects for aberration.

22. Star tracker apparatus as set forth in claim 21 wherein the second holographic lens has optical power for focussing the radiation upon one of the plurality of radiation detection means.

* * * * *